Nov. 10, 1959 S. KRYSTEK 2,912,647
TESTING PROBES
Filed March 2, 1956
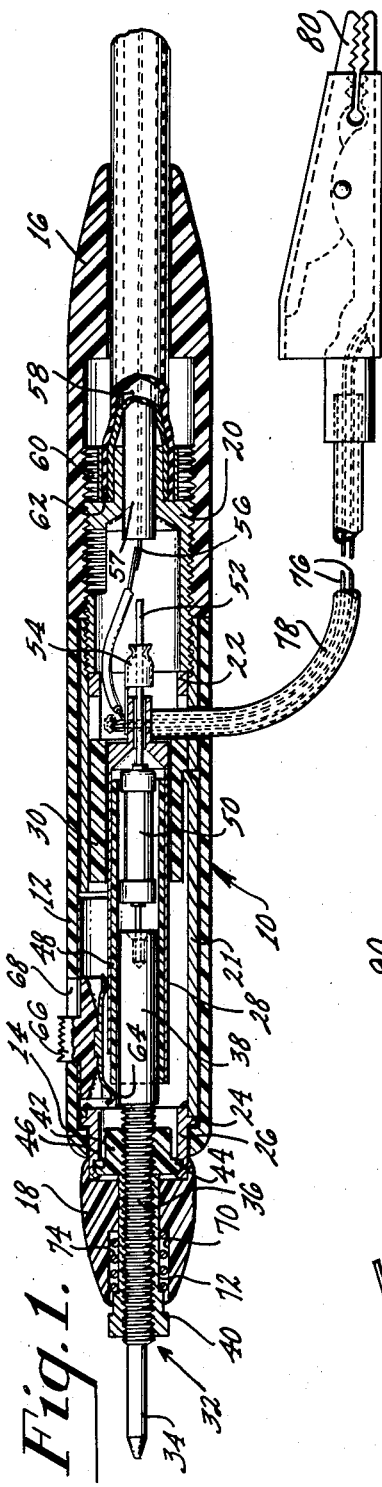
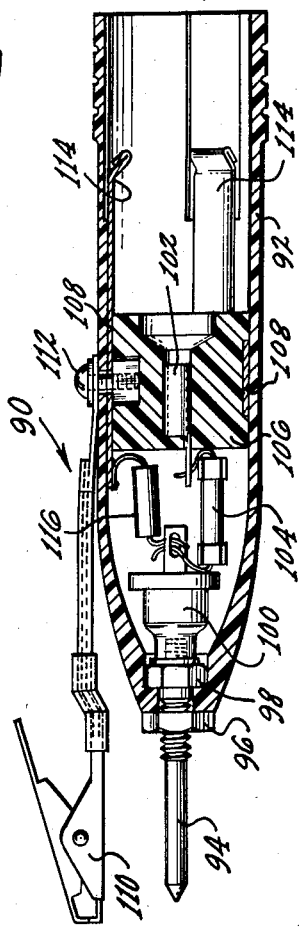
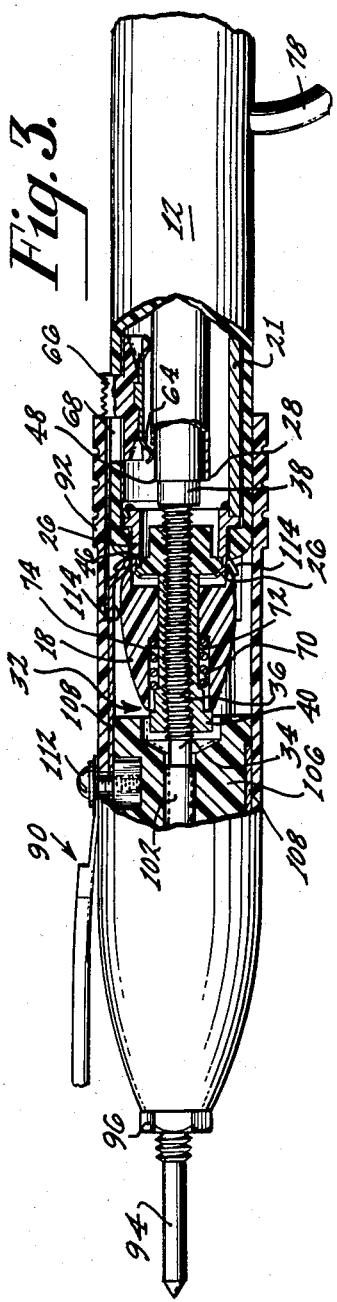
INVENTOR.
Stanley Krystek
BY
ATTORNEY.

United States Patent Office 2,912,647
Patented Nov. 10, 1959

2,912,647

TESTING PROBES

Stanley Krystek, Camden, N.J., assignor to Radio Corporation of America, a corporation of Delaware Application March 2, 1956, Serial No. 569,038

4 Claims. (Cl. 324—72.5)

This invention relates to testing probes, and more particularly to probes adapted for use with testing and measuring instruments such as vacuum tube voltmeters, oscilloscopes, and the like. The testing probes of the present invention are particularly useful in testing high impedance circuits of the type found in television sync separators and video amplifier stages, for example, which would not operate properly if loaded by a conventional high capacitance testing probe.

The conventional high capacity low impedance probe that comprises merely a direct connection from a circuit under test to a testing instrument cannot be used for testing high frequency, high impedance circuits of the type encountered in television receivers. Television video amplifier circuits, for example, are high impedance circuits that can be tested properly only with a probe presenting a high impedance characteristic to the circuit. The conventional low impedance probe will overload these high impedance circuits so that they will not function in the manner in which they were intended to function. Prior art high impedance probes have been relatively bulky because of the necessity for including electrical components within the probe itself. Such probes also lacked the versatility of converting to a low impedance probe, as may be desirable for use in testing low impedance circuits.

Accordingly, it is an object of the present invention to provide an improved testing probe intended to overcome the aforementioned disadvantages.

Another object of the present invention is to provide an improved testing probe adapted for use in testing circuits of either a high or a low impedance, and over a wide range of frequencies.

It is still another object of the present invention to provide a testing probe comprising a high impedance and using components that are small and compactly arranged.

A further object of the present invention is to provide an improved testing probe having a shock protective, spring loaded insulating shell tip so that an accessory probe may be attached compactly to the main testing probe in a manner whereby the shielding means of the main probe are extended safely to the accessory probe.

It is still a further object of the present invention to provide an improved testing probe having a relatively high impedance for testing high impedance circuits, and having switch means for shorting the high impedance means when low impedance circuits are to be tested.

A still further object of the present invention is to provide an improved testing probe comprising a capacitor therein and means for varying the capacity of the capacitor by rotating the tip of the testing probe for circuit matching purposes.

In accordance with the present invention, the foregoing objects and related advantages are attained in an improved testing probe comprising a probe tip assembly having an intermediate portion thereof in threaded engagement with the front end of an insulating shell assembly. The front portion of the probe tip assembly is used for contacting the portion of the circuit to be tested, and the rear portion of the probe tip assembly comprises a piston or inner conductor of a capacitor. A tubular outer conductor of the capacitor is fixed within the probe shell and is in slidable contact with one end of a resistor whose other end is fixed to the inner conductor. Thus, the rear portion of the probe tip assembly and the capacitor are movable within the outer conductor of the capacitor when the probe tip is rotated. This capacitor adjustment is necessary for impedance matching purposes in testing high frequency, high impedance circuits. The tip end of the insulating probe shell assembly may be urged forwardly against spring tension to expose the shielding means of the probe. With this structure, it is possible to attach an accessory probe safely to the tip of the main testing probe in a manner whereby the normally unexposed shielding means within the main probe are extended to the shielding means of the accessory probe.

The novel features of the present invention, as well as the invention itself, will be understood in detail from the following description when considered in connection with the accompanying drawing in which similar reference characters represent similar parts, and in which:

Fig. 1 is a side elevational view in cross-section, of a testing probe, in accordance with the present invention;

Fig. 2 is a side elevational view in cross-section, of an accessory probe adapted to be attached to the front end of the probe of Fig. 1; and Fig. 3 is a side elevational view, with sections broken away and partly in cross-section, showing a combination of the probes illustrated in Figs. 1 and 2.

Referring now particularly to Fig. 1, there is shown a testing probe 10 adapted for use in testing circuits of both high and low impedance. The probe 10 comprises a main or central insulating probe shell 12. The central probe shell 12 may be molded of any suitable plastic that is a good electrical insulator. The central probe shell 12 is tubular and is formed with an inwardly extending annular flange 14 defining the forward open end thereof. A rear probe shell 16, also of tubular structure, is contiguous with the rear end of the central probe shell 12 and is coaxially disposed therewith. A front probe shell 18 is normally contiguous with the flange 14 of the central probe shell 12 and is disposed coaxially with the main probe shell. The central shell 12, the rear shell 16, and the front shell 18 comprise the shell assembly of the probe 10.

Shielding means are provided within probe shells 12, 16, and 18. To this end, an electrically conducting tube 20 is disposed within the central probe shell 12 and the rear probe shell 16 and is coaxially aligned therewith. External threads on the tube 20 are engaged with internal threads on the rear probe shell 16. A grounding ring 22 is in physical contact with the forward end of the tube 20 and with the inner surface of the tubular shield 21, and serves to extend the shielding means. The tubular shield 21 abuts the rear surface of an outwardly extending annular flange 24 of a metallic bushing 26, disposed within the forward end of the central probe shell 12. The front surface of the flange 24 abuts against the rear surface of the inwardly extending annular flange 14 of the central probe shell 12. The bushing 26 extends through the front opening of the main probe shell 12 and into the rear opening of the tip or front probe shell 18, for the purpose hereinafter appearing.

Capacitance and resistance means are disposed within the central probe shell 12. To this end, a tubular member, or outer conductor 28, is disposed coaxially within the tubular shield 21, and is spaced therefrom by an insulating ring 30. The outer conductor 28 is the outer conductor of a capacitor, as will be hereinafter described.

Means are provided to mount a probe tip assembly 32 at the front end of the testing probe 10. The probe tip assembly 32 comprises a front tip portion 34, an intermediate threaded portion 36, and a rear piston portion or inner conductor 38. The probe tip assembly 32 is disposed along the axis of the probe shells 12, 16, and 18 and is threadably engaged within a bushing 40 and an insulator 42. The intermediate threaded portion 36 of the probe tip assembly 32 is threadably engaged with internal threads in the bushing 40 and the insulator 42. A transversely extending annular groove 44 of the insulator 42 is disposed within an annular groove 46 on the inner surface of the bushing 26. The rear piston portion 38 extends within the outer conductor 28 and is insulated therefrom by a dielectric material 48. It will now be understood that the outer conductor 28 and the inner conductor 38, separated by the dielectric material 48, comprise a variable capacitor whose capacity may be varied by rotating the front tip portion 34 clockwise or counter-clockwise, whereby the inner conductor 38 may be moved rearwardly or forwardly, as desired.

A resistor 50 is connected across the capacitor in a manner to obtain maximum shielding, maximum conservation of space, and maximum freedom from unwanted spurious oscillations. The resistor 50 is disposed within the outer conductor 28. One end of the resistor 50 is electrically connected to the rearward portion of the inner conductor 38, in any suitable manner, as by soldering; and the other end of the resistor 50 is connected to the outer conductor 28 through an axially aligned wire 52 in spring contact with a spring lug terminal 54. The spring lug terminal 54 is connected to the outer conductor 28, as by solder, and the wire 52 is free to slide rearwardly or forwardly when the front tip portion 34 of the probe tip assembly 32 is rotated. The spring lug terminal 54 is connected to the inner conductor 56 of a radio-frequency coaxial cable 57 that extends rearwardly through the rear probe shell 16. An outer shielding conductor 58 of the coaxial cable 57 is maintained in electrical contact with the shielding tube 20 by an externally threaded ring 60, in threaded engagement with the rear probe shell 16, and by a metallic ring 62.

In the event that it is desired to use the testing probe 10 for testing low impedance circuits, and in order to obtain a greater gain, the variable capacitor and the resistor 50 may be shorted so that a direct electrical connection can be had from the front tip portion 34 of the probe tip assembly 32 to the inner conductor 56 of the coaxial cable 57. To this end, a switch comprising a metallic spring 64 is disposed within the central probe shell 12 so that it may contact the outer conductor 28 and the inner conductor 38 of the capacitor, and thereby short the capacitor and the resistor 50, in the forward position of a switch button 66. The switch contact 64 is fixed to the switch button 66 by any suitable means known in the art. The switch button 66 is disposed within a slot 68 in a main probe shell 12. In one position of the switch button 66, as in the forward position illustrated in Fig. 1, the outer conductor 28 and the inner conductor 38 of the capacitor are shorted by the switch spring 64. In a second position of the switch button 66, as in the rearward position thereof illustrated in Fig. 3, the switch spring 64 rides on both the outer conductor 28 and the dielectric material 48, and a capacitor is not shorted. In this latter position the high impedance network, comprising the capacitor and the resistor 50, is connected in series with the front portion 34 and the conductor 56 of the coaxial cable 57.

The front probe shell 18 is formed with an internal annular groove 70 at the forward end thereof. The bushing 40 is formed with an external annular groove 72 coaxially disposed with the internal annular groove 70 of the front probe shell 18. A spring 74 is disposed within the annular grooves 70 and 72 and functions to bias the front probe shell 18 against the main or central probe shell 12. It will be understood that if the front probe shell 18 were pushed forwardly, against the spring tension of the spring 74, the outer surface of the bushing 26 will be exposed, thereby exposing the shielding means of the probe 10. This shielding is usually grounded to the chassis of a circuit under test. To permit this function, the inner wires 76 of an insulated cable 78 are soldered to the inner surface of the grounding ring 22. The insulated cable 78 extends through aligned openings in the grounding ring 22, in the tubular shield 21 and in the main probe shell 12. The wires 76 are connected to a clip 80 for connecting the shielding means of the probe 10 to a point of the circuit under test, usually chassis ground.

Referring now to Fig. 2, there is shown an accessory probe 90 adapted to be used in combination with probes of the type illustrated in Fig. 1. The probe 90 is adapted to slip onto the tip end of the probe 10. The probe 90 is of the crystal-diode type adapted for use in testing relatively high frequency circuits where root-mean-square values of sine waves, or the average value of complex waves in the neighborhood of 50 kc. to 250 mc., are to be measured. The probe 90 comprises a single probe shell 92 tapering inwardly at its forward end. A probe tip 94 is fixed to the front end of the probe shell 92, as by nuts 96 and 98. The rear portion of the probe tip 94 is in threaded engagement with one conductor of a capacitor 100. The other conductor of the capacitor 100 is connected to a jack contact 102 through a resistor 104. The jack contact 102 is shaped to receive the front tip portion 34 of the probe 10. The jack contact 102 is axially disposed within the probe shell 92 by means of an insulator spacer 106. A metallic shielding ring 108 is disposed within and contiguous to the probe shell 92. A clip 110 is connected to the shielding ring 108 through a screw 112 passing through aligned openings in the probe shell 92 and in the shielding ring 108. The shielding ring 108 is formed with a plurality of rearwardly extending spring arms 114. The rear ends of the spring arms 114 are biased inwardly toward the axis of the probe shell 12 for the purpose hereinafter appearing. A resistor 116 may also be connected between the capacitor 100 and the shielding ring 108.

The operation of the accessory probe 90 in cooperation with the probe 10 will now be described. Let it be assumed that the probe 10 has its coaxial cable 57 connected to a testing instrument (not shown) because it has been used to test circuits requiring the use of the test probe 10. Let it also be assumed that it is now desirable to test certain circuits requiring a probe having the characteristics of both the probes 90 and 10. The probe 90 is now slipped onto the front end of the probe 10 so that the front tip portion 34 of the probe 10 extends into the jack contact 102 of the accessory probe 90, as illustrated in Fig. 3. The accessory probe 90 is telescoped onto the probe 10 until the spring arms 114, in contact with the rounded rear end of the front probe shell 18, bias the front probe shell 18 of the probe 10 forwardly, and make electrical contact with the outer surface of the metallic bushing 26, whereby the grounding means of the probe 10 are extended to the accessory probe 90. The physical dimensions of the probes 10 and 90 may be such that, when the probe 10 is telescoped within the probe shell 92 of the probe 90, the two probes will be in proper operating condition for testing a circuit. Thus, the switch button 66 of the probe 10 will be pushed to an extreme rearward position by the rear end of the probe shell 92 by pressing against the forward portion of the switch button 66, as shown in Fig. 3. In this manner the probe 90 may automatically switch the probe 10 into a proper operating position during the telescoping action of the two probes. It will also be understood that when the accessory probe 90 is detached from the main probe 10, the front probe shell 18 is urged into close contact with the central probe shell 12 by the spring 74, whereby the bushing 26 is completely covered for safety purposes.

What is claimed is:

1. A probe comprising an elongated insulated shell assembly, electrically conducting shielding means coaxially disposed within said shell, a capacitor having a tubular outer conductor disposed within said shielding means and coaxially aligned therewith and insulated therefrom, an elongated probe tip assembly coaxially aligned with said tubular outer conductor, said probe tip assembly comprising a front portion, an intermediate screw portion and a rear portion, means mounting said probe tip assembly at one end of said shell assembly, said intermediate portion being in threaded engagement in said mounting means, said rear portion extending within said tubular outer conductor and insulated therefrom and comprising an inner conductor of said capacitor whereby the capacity of said capacitor may be varied by rotating said front portion of said probe tip assembly, an elongated resistor disposed coaxially within said outer conductor and having one end fixed to the rear portion of said inner conductor, means connecting the other end of said resistor slidably with said outer conductor, means extending said shielding means through the other end of said shell assembly, and means connecting said outer conductor through said other end of said shell assembly.

2. In a probe of the type comprising an elongated insulating shell assembly, shielding means disposed within said shell assembly and substantially coaxially aligned therewith, and a probe tip assembly, the combination therewith of means mounting said tip assembly in threaded engagement at one end of said shell assembly and coaxially aligned with said shielding means and insulated therefrom, said shell assembly comprising a front shell and a main shell, spring means between said mounting means and said front shell urging said front shell into contact with said main shell, and said front shell being slidable on said shielding means whereby to expose said shielding means when said front shell is urged forwardly against said spring means.

3. In a probe of the type comprising an elongated insulating shell assembly, shielding means disposed within said shell assembly and substantially coaxially aligned therewith, and a probe tip assembly; the combination therewith of means mounting said tip assembly in threaded engagement at one end of said shell assembly and coaxially aligned with said shielding means and insulated therefrom, said shell assembly comprising a main shell and a front shell, said front shell surrounding said shielding means and a portion of said probe tip assembly, spring means urging said front shell into contact with one end of said main shell, said front shell being slidable over said shielding means whereby to expose said shielding means when said front shell is urged forwardly against said spring means, and a tubular outer conductor coaxially aligned with and spaced from said shielding means and surrounding the rear end of said probe tip assembly and spaced therefrom and forming a capacitor therewith.

4. In combination, a main probe and an accessory probe, said main probe comprising an elongated insulating shell assembly, said shell assembly comprising a front shell and a main shell, shielding means disposed within said shell assembly and substantially coaxially aligned therewith, a probe tip assembly, means mounting said tip assembly in threaded engagement at one end of said shell assembly and coaxially aligned therewith and insulated from said shielding means, spring means urging said front shell into engagement with said main shell, said accessory probe comprising an insulating shell adapted to telescope over said front shell and said main shell of said main probe, said accessory probe having a tip assembly fixed to the front end of its shell, shielding means within said shell of said accessory probe and insulated from said tip assembly thereof, means to connect said tip assembly of said accessory probe with said tip assembly of said main probe when said accessory probe is telescoped over said main probe, and said shielding means of said accessory probe comprising means to urge said front shell of said main probe forwardly to contact said shielding means of said main probe when said accessory probe is telescoped thereover.

References Cited in the file of this patent

UNITED STATES PATENTS 2,578,608     Shull                Dec. 11, 1951

OTHER REFERENCES

Louis: Radio and Television News, September 1952, pp. 64–65 and 168.

Liebscher: Radio and Television News, August 1953, pp. 40–42.